United States Patent [19]

Hara et al.

[11] Patent Number: 5,594,079
[45] Date of Patent: Jan. 14, 1997

[54] METHOD FOR PRODUCING A POLYOLEFIN

[75] Inventors: Daiji Hara; Masahiro Adachi, both of Yokkaichi; Mitsuhiro Mori, Aichi, all of Japan

[73] Assignee: Tosoh Corporation, Shinnanyo, Japan

[21] Appl. No.: 601,473

[22] Filed: Feb. 14, 1996

Related U.S. Application Data

[63] Continuation of Ser. No. 462,317, Jun. 5, 1995, abandoned, which is a continuation of Ser. No. 98,863, Jul. 29, 1993, abandoned.

[30] Foreign Application Priority Data

Aug. 6, 1992 [JP] Japan ..................... 4-229373

[51] Int. Cl.$^6$ ............... C08F 4/653; C08F 4/655; C08F 10/06
[52] U.S. Cl. ............ 526/119; 502/119; 502/128; 526/125.3; 526/125.4; 526/351
[58] Field of Search ............................... 526/119

[56] References Cited

U.S. PATENT DOCUMENTS

| | | | |
|---|---|---|---|
| 2,922,782 | 1/1960 | Hay | 526/133 |
| 3,444,153 | 5/1969 | Foder | 526/133 |
| 4,277,589 | 7/1981 | Giannini et al. | 526/125 |
| 4,814,314 | 3/1989 | Matsuura et al. | 526/119 |
| 5,043,467 | 8/1991 | Costello et al. | |
| 5,112,786 | 5/1992 | Fujita et al. | 526/125 |
| 5,112,927 | 5/1992 | Hara et al. | |
| 5,229,476 | 7/1993 | Hara et al. | |
| 5,244,989 | 9/1993 | Hara et al. | |

FOREIGN PATENT DOCUMENTS

| | | | |
|---|---|---|---|
| 475134 | 3/1992 | European Pat. Off. | |
| 846731 | 8/1960 | United Kingdom | 526/133 |

OTHER PUBLICATIONS

Japanese Abstracts, Jul. 23, 1990, JP-A-187406.

*Primary Examiner*—Edward J. Smith
*Attorney, Agent, or Firm*—Oblon, Spivak, McClelland, Maier & Neustadt, P.C.

[57] ABSTRACT

A method for producing a stereoregular polyolefin in the presence of a catalyst comprising a transition metal compound and an organometallic compound, which comprises polymerizing at least one olefin in the presence of a catalyst system comprising:

(A) a solid catalyst component comprising Mg, Ti, halogen and an electron donative compound, (B) at least one member selected from the group consisting of organometallic compounds of metals of Groups IA, IIA, IIB, IIIB and IVB of the Periodic Table, (C) an electron donative compound, and (D) a boron compound of the formula $R^1{}_n BX_{3-n}$ wherein $R^1$ is a hydrocarbon group and/or a halogenated hydrocarbon group, X is a halogen atom, and $0 \leq n \leq 3$.

5 Claims, No Drawings

METHOD FOR PRODUCING A POLYOLEFIN

This application is a Continuation of application Ser. No. 08/462,317, filed on Jun. 5, 1995, now abandoned, which was a Continuation of application Ser. No. 08/098,863, filed on Jul. 29, 1993, now abandoned.

The present invention relates to a method for producing a highly stereoregular polyolefin. More particularly, the present invention relates to a method whereby a highly stereoregular polymer having a good particle shape can be obtained in good yield by using a certain specific catalyst in polymerization of an α-olefin having at least 3 carbon atoms.

Heretofore, as a catalyst for polymerization of an olefin, an α-type titanium trichloride obtained by reducing titanium tetrachloride with hydrogen, a purple γ-type titanium trichloride obtained by reducing titanium tetrachloride with aluminum or a δ-type titanium trichloride obtained by pulverizing such a titanium trichloride by a ball mill, has been, for example, known. Further, as a method for modifying such catalysts, it is known to subject them to mixing and pulverizing treatment together with various modifying agents. However, when polymerization was conducted by using such a catalyst, the catalytic activities for polymerization were low, and the catalyst residue in the resulting polymer was substantial, whereby a so-called deashing step was indispensable.

Further, in recent years, a number of proposals have been made for producing a solid catalyst component comprising magnesium, titanium and halogen as the main components. Magnesium halide-supported catalysts have a feature that they have high catalytic activities and provide a high level of stereoregularity of polymers, as compared with the titanium trichloride type catalysts, but a further improvement is desired with respect to the catalytic activities, the stereoregularity, the powder properties, etc. To control the stereoregularity in such magnesium halide-supported catalyst technologies, a number of methods have been disclosed in which an electron donative compound is added at the time of polymerization. Among them, a method of using a silicon compound as such an electron donative compound, is disclosed in Japanese Unexamined Patent Publication No. 83006/1983. Further, Japanese Unexamined Patent Publications No. 54705/1987 and No. 187406/1990 propose a method of incorporating a boron compound containing a B—O—R bond, in addition to the electron donative compound. In Japanese Unexamined Patent Publication No 54705/1987, it is stated to control the initial activities. However, the present inventors have found that when a boron compound containing a B—O—R bond is incorporated, the activities decrease remarkably, and it is difficult to realize high catalytic activities.

The present inventors have conducted extensive studies to obtain a catalyst for polymerization of an olefin having high catalytic activities capable of controlling the particle size within a wide range while maintaining the high stereoregularity, in order to overcome the drawbacks of the prior art. As a result, it has been found possible to solve the above-mentioned problems by using a solid catalyst component comprising Mg, Ti, Cl and an electron donor, as identified below, together with an organometallic compound, an electron donative compound and a boron compound of the formula $R^1_n BX_{3-n}$. The present invention has been accomplished on the basis of this discovery.

Thus, the present invention provides a method for producing a stereoregular polyolefin in the presence of a catalyst comprising a transition metal compound and an organometallic compound, which comprises polymerizing at least one olefin in the presence of a catalyst system comprising:

(A) a solid catalyst component comprising Mg, Ti, halogen and an electron donative compound, (B) at least one member selected from the group consisting of organometallic compounds of metals of Groups IA, IIA, IIB, IIIB and IVB of the Periodic Table, (C) an electron donative compound, and (D) a boron compound of the formula $R^1_n BX_{3-n}$ wherein $R^1$ is a hydrocarbon group and/or a halogenated hydrocarbon group, X is a halogen atom, and $0 \leq n \leq 3$.

Now, the present invention will be described in detail with reference to the preferred embodiments.

The solid catalyst component as the catalyst component (A) to be used in the present invention can be prepared, for example, by the following method.

Namely, it can be prepared by reacting (i-1) at least one member selected from the group consisting of metal magnesium and a hydroxylated organic compound, and oxygen-containing organic compounds of magnesium, (i-2) an oxygen-containing organic compound of aluminum, and (i-3) an oxygen-containing organic compound of titanium, to obtain a homogeneous solution; reacting the homogeneous solution with (i-4) an aluminum halide, to obtain a solid product; and reacting the solid product with (i-5) an electron donative compound, and (i-6) a titanium halide compound.

When metal magnesium and a hydroxylated organic compound are used as the above reactant (i-1), metal magnesium can take any form such as powder form, granular form, foil form or ribbon form, and as the hydroxylated organic compound, alcohols and organic silanols are suitable.

As the alcohols, linear or branched aliphatic alcohols, alicyclic alcohols having from 1 to 18 carbon atoms, or aromatic alcohols can be used. Specific examples include methanol, ethanol, n-propanol, i-propanol, n-butanol, iso-butanol, sec-butanol, t-butanol, n-hexanol, 2-ethylhexanol, n-octanol, i-octanol, n-stearyl alcohol, cyclopentanol, cyclohexanol and ethylene glycol. Further, benzyl alcohol and phenols such as phenol, cresol, xylenol and hydroquinone, may also be mentioned.

The organic silanols are selected from compounds having at least one hydroxyl group and an organic group which is an alkyl group having from 1 to 12 carbon atoms, preferably from 1 to 6 carbon atoms, cycloalkyl, arylalkyl, aryl or alkylaryl. For example, trimethylsilanol, triethylsilanol, triphenylsilanol and t-butyldimethylsilanol may be mentioned.

These hydroxylated organic compounds may be used alone or in combination as a mixture of two or more of them.

In addition, when metal magnesium is used to prepare the solid component as the component (A) of the present invention, it is advisable to add one or more substances that will react with the metal magnesium or will form an adduct, for example, polar substances such as iodine, mercuric chloride, an alkyl halide and an organic acid, for the purpose of accelerating the reaction.

Compounds belonging to the oxygen-containing organic compounds of magnesium include, for example, magnesium alkoxides such as magnesium methylate, magnesium ethylate, magnesium isopropylate, magnesium decanolate, magnesium methoxyethylate and magnesium cyclohexanolate, magnesium alkylalkoxides such as magnesium ethylethylate, magnesium hydroalkoxides such as magnesium hydroxymethylate, magnesium phenoxides such as magnesium phenate, magnesium naphthenate, magnesium phenanthlenate and magnesium cresolate, magnesium carboxylates such as magnesium acetate, magnesium stearate, magnesium benzoate, magnesium phenylacetate, magnesium adipate, magnesium sebacate, magnesium phthalate, magnesium acrylate and magnesium oleate, magnesium oxymates such as magnesium butyloxymate, magnesium dimethylglyoxymate and magnesium cyclohexyoxymate, magnesium hydroxymate salts, magnesium hydroxylamine salts such as N-nitroso-N-phenyl-hydroxylamine derivatives, magnesium enolates such as magnesium acetylacetonate, and magnesium silanolates such as magnesium triphenyl silanolate. These oxygen-containing organic magnesium compounds may be used alone or in combination as a mixture of two or more of them.

As the oxygen-containing organic compound of aluminum for the reactant (i-2), an oxygen-containing organic compound of the formula $Al(OR^2)_m X_{3-m}$ may be used. In this formula, $R^2$ represents a hydrocarbon group having from 1 to 20 carbon atoms, preferably from 1 to 10 carbon atoms. Such a hydrocarbon group may, for example, be a linear or branched alkyl group, a cycloalkyl group, an arylalkyl group, an aryl group or an alkylaryl group. m is a number satisfying $0<m\leq 3$, and X represents a halogen atom.

Specific examples of the oxygen-containing organic compound of aluminum include trimethoxyaluminum, triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexoxy)aluminum, triphenoxyaluminum, tribenzyloxyaluminum, dichloromethoxyaluminum, chlorodimethoxyaluminum, dichloro(2-ethylhexoxy)aluminum, chlorodi(2-ethylhexoxy)aluminum, dichlorophenoxyaluminum and chlorodiphenoxyaluminum. Use of an oxygen-containing organic compound of aluminum having several different hydrocarbon groups is also within the scope of the present invention. These oxygen-containing organic compounds of aluminum may be used alone or in combination as a mixture of two or more of them.

As the oxygen-containing organic compound of titanium for the reactant (i-3), a compound of the formula $[O_p Ti_u (OR^3)_q]_s$ may be used. In the formula, $R^3$ represents a hydrocarbon group having from 1 to 20 carbon atoms, preferably from 1 to 10 carbon atoms. Such a hydrocarbon group may, for example, be a linear or branched alkyl group, a cycloalkyl group, an arylalkyl group, an aryl group or an alkylaryl group. p, q and u are such that $p\geq 0$, $q>0$ and $u\geq 1$ and they are numbers agreeable with the valance of Ti, and s is an integer. It is particularly preferred to use an oxygen-containing organic compound of titanium wherein $0\leq p\leq 1$, $1\leq u\leq 2$ and $1\leq s\leq 6$. Specific examples include titanium tetramethoxide, titanium tetraethoxide, titanium tetra-n-propoxide, titanium tetra-i-propoxide, titanium tetra-n-butoxide, titanium tetra-i-butoxide, tetra(n-nonyl)titanate, tetra(2-ethylhexyl)titanate, tetracresyl titanate and hexa-i-propoxy dititanate. Use of an oxygen-containing organic compound of titanium having several different hydrocarbon groups is also within the scope of the present invention. These oxygen-containing organic compounds of titanium may be used alone or in combination as a mixture or as a reaction product of two or more of them.

As the halogenated aluminum compound for the reactant (i-4), the one represented by the formula $AlR^4_r X_{3-r}$ may be used. In the formula, $R^4$ represents a hydrocarbon group having from 1 to 20 carbon atoms, X represents a halogen atom, and r is a number satisfying $0<r\leq 2$. $R^4$ is preferably selected from the group consisting of a linear or branched alkyl group, an alkoxy group, an cycloalkyl group, an arylalkyl group, an aryl group and an alkylaryl group. Such halogenated aluminum compounds may be used alone or in combination as a mixture of two or more of them. Specific examples of the halogenated aluminum compound include ethyl aluminum dichloride, n-propylaluminum dichloride, butylaluminum dichloride, i-butylaluminum dichloride, sesquiethylaluminum chloride, sesqui-i-butylaluminum chloride, sesqui-i-propylaluminum chloride, sesqui-n-propylaluminum chloride, diethylaluminum chloride, di-i-propylaluminum chloride, di-n-propylaluminum chloride, di-i-butylaluminum chloride, diethylaluminum bromide and diethylaluminum iodide.

The electron donative compound for the reactant (i-5) includes, for example, ethers, esters, ketones, phenols, amines, amides, imines, nitriles, phosphines, phosphites, stibines, arsines, phosphoryl amides and alcoholates. Among them, esters are preferred, and organic acid esters are most preferred. As the organic acid esters, mono- or di-esters of aromatic carboxylic acids, or mono- or di-esters of aliphatic carboxylic acids may be mentioned. Specific examples include butyl formate, ethyl acetate, butyl acetate, isobutyl isobutylate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diethyl maleate, dibutyl maleate, diisobutyl maleate, monomethyl fumarate, diethyl fumarate, diisobutyl fumarate, diethyl tartarate, dibutyl tartarate, diisobutyl tartarate, methyl benzoate, ethyl benzoate, methyl p-toluate, ethyl p-toluate, ethyl p-tert-butylbenzoate, ethyl p-anisate, isobutyl α-naphthoate, ethyl cinnamate, monomethyl phthalate, dibutyl phthalate, diisobutyl phthalate, dihexyl phthalate, dioctyl phthalate, di(2-ethylhexyl)phthalate, diallyl phthalate, diphenyl phthalate, diethyl isophthalate, diisobutyl isophthalate, diethyl terephthalate, dibutyl terephthalate, diethyl phthalate and dibutyl naphthalate. Such electron donative compounds for the reactant (i-5) may be used alone or in combination as a mixture of two or more of them.

As the halogenated titanium compound for the reactant (i-6), a titanium compound of the formula $Ti(OR^5)_f X_{4-f}$ may be used. In the formula, $R^5$ represents a hydrocarbon group having from 1 to 20 carbon atoms, X represents a halogen atom, and f is a number satisfying $0\leq f<4$. $R^5$ is preferably selected from the group consisting of a linear or branched alkyl group, an alkoxy group, a cycloalkyl group, an arylalkyl group, an aryl group and an alkylaryl group. Such halogenated titanium compounds may be used alone or combination as a mixture of two or more of them.

Specific examples of the halogenated titanium compound include titanium tetrachloride, ethoxytitanium trichloride, propoxytitanium trichloride, butoxytitanium trichloride, phenoxytitanium trichloride, diethoxytitanium dichloride, triethoxytitanium chloride, titanium tetrabromide and titanium tetraiodide.

The solid catalyst component to be used in the present invention, can be prepared by reacting the reactant (i-4) to a homogeneous solution obtained by reacting the above reactants (i-1) (i-2) and (i-3), to obtain a solid product, and then reacting the reactants (i-5) and (i-6) to the obtained solid product. These reactions are preferably conducted in a liquid medium. Therefore, when these reactants are not liquid by themselves under the operating conditions, or when the amount of liquid reactants is not sufficient, the reaction should be conducted in the presence of an inert organic solvent. As such an inert organic solvent, any solvent which is commonly used in this technical field may be employed. For example, an aliphatic, alicyclic or aromatic hydrocarbon or a halogenated derivative thereof, or a mixture thereof, may be mentioned. Specific examples include, isobutane, pentane, isopentane, hexane, heptane, cyclohexane, benzene, toluene, xylene, chlorobenzene, 1,2-dichlorobenzene, 1,3-dichlorobenzene, benzyl chloride, methylene dichloride, 1,2-dichloroethane, 1,3-dichloropropane, 1,4-dichlorobutane, 1,1,1-trichloroethane, 1,1,2-trichloroethane, 1,1,1,2-tetrachloroethane, 1,1,2,2-tetrachloroethane, tetrachloroethylene, carbon tetrachloride and chloroform. These organic solvents may be used alone or in combination as a mixture. When a halogenated derivative or a mixture of halogenated derivatives is used, a good result may sometimes be brought about with respect to the polymerization activities or the stereoregularity of the resulting polymer.

There is no particular restriction as to the amounts of the above reactants (i-1), (i-2), (i-3), (i-4), (i-5) and (i-6) used to obtain the solid catalyst component. However, the molar ratio of the magnesium atom (i-1) to the oxygen-containing organic compound of aluminum (i-2) is preferably selected within a range of from 1:0.01 to 1:20, or within a range of from 1:0.05 to 1:10 especially when it is intended to obtain polymer particles of a pellet size of at least 3,000 μm. Further, the molar ratio of the magnesium atom (i-1) to the oxygen-containing organic compound of titanium (i-3) is preferably selected within a range of from 1:0.01 to 1:20, or preferably within a range of from 1:0.1 to 1:5 especially when it is intended to obtain polymer particles of a pellet size having excellent powder properties. Furthermore, it is preferred to select the amounts of the reactants so that the ratio of the magnesium atom to the aluminum atom in the halogenated aluminum (i-4) will be within a range of from 1:0.1 to 1:100, preferably from 1:0.1 to 1:20. If the ratio of the aluminum atom is larger than this range, the catalytic activities are likely to be low, or it tends to be difficult to obtain good powder properties. On the other hand, if the ratio is too small, it is likely that good powder properties will hardly be obtained. It is preferred to select the amounts so that the molar ratio of the magnesium atom (i-1) to the electron donative compound (i-5) will be within a range of from 1:0.05 to 1:5.0, preferably from 1:0.1 to 1:2.0. If the molar ratio departs from this range, a problem may result such that the polymerization activities are low or the stereoregularity of the polymer is low. Further, it is preferred to select the amounts so that the molar ratio of the magnesium atom (i-1) to the halogenated titanium compound (i-6) will be within a range of from 1:1 to 1:100, preferably from 1:3 to 1:50. If the molar ratio departs from this range, a problem may result such that the polymerization activities are low, or the product will be colored.

With respect to the reaction conditions to obtain the homogeneous solution by the reaction of the reactants (i1), (i-2) and (i-3), the reaction is conducted at a temperature within a range of from −50° to 300° C., preferably from 0° to 200° C. for from 0.5 to 50 hours, preferably from 1 to 6 hours, in an inert gas atmosphere under an ordinary pressure or an elevated pressure. In such a case, formation of a homogeneous solution may be facilitated by adding the same electron donative compound as the above-mentioned compound (i-5). Further, at the time of reacting the reactants (i-4), (i-5) and (i-6), the reaction is conducted at a temperature within a range of from −50° to 200° C., preferably from −30° to 150° C., for from 0.2 to 50 hours, preferably from 0.5 to 10 hours, in an inert gas atmosphere under an ordinary pressure or an elevated pressure.

The reaction of the reactant (i-4) is important, and it is very important since it plays a decisive role for controlling the resulting solid product particles, the solid component particles, and the particle size and shape of the polymer particles obtained by using them.

Further, at the time of the reaction of the reactant (i-6), the reaction may be conducted in the presence of ethylene and/or an α-olefin represented by the formula R—CH=CH$_2$ wherein R is a linear or branched, substituted or unsubstituted alkyl group having from 1 to 10 carbon atoms, preferably from 1 to 8 carbon atoms, or a hydrogen atom. In such a case, it is sometimes possible that an improvement is observed in the catalytic activities and the stereoregularity of the polymer.

Further, the reaction of the reactant (i-6) may be conducted dividedly in multi steps.

The solid catalyst component (A) thus obtained may be used as such, but is usually used as suspended in an inert organic solvent after removing the remaining non-reacted substances and by-products by filtration or decantation and thoroughly washing it with an inert organic solvent. It is also possible to use the one obtained by isolation after the washing, followed by heating under an ordinary pressure or reduced pressure to remove the inert organic solvent.

Further, prior to the main polymerization, a small amount of the organometallic compound may be added to polymerize a small amount of ethylene and/or an α-olefin of the formula R—CH=CH$_2$ wherein R is a linear or branched, substituted or unsubstituted alkyl group having from 1 to 10 carbon atoms, preferably from 1 to 8 carbon atoms, or a hydrogen atom, to obtain a prepolymer, which is then used.

The catalyst component (A) thus obtained is used for polymerization of an olefin in combination with the organometallic compound of component (B), the electron donative compound of component (C) and the boron compound of component (D).

The organometallic compound of component (B) may, for example, be an organometallic compound comprising a metal such as lithium, magnesium, zinc, tin or aluminum, and an organic group. As the organic group, an alkyl group may be mentioned as a representative. As such an alkyl group, a liner or branched alkyl group having from 1 to 20 carbon atoms may, be employed. Specifically, n-butyl lithium, diethylmagnesium, diethylzinc, trimethylaluminum, tri-i-butylaluminum, tri-n-butylaluminum, tri-n-decylaluminum, tetraethyltin or tetrabutyltin, may, for example, be mentioned.

Among them, a trialkylaluminum of the formula AlR$^6_3$ is preferred. In the formula, R$^6$ is a linear or branched alkyl group having from 1 to 10 carbon atoms. Specific examples include trimethylaluminum, triethylaluminum, tri-n-propylaluminum, tri-n-butylaluminum, triisobutylaluminum, triisoprenylaluminum, tri-n-hexylaluminum, tri-n-octylaluminum and tri(2-methylpentyl)aluminum.

Further, an alkylaluminum halide, an alkylaluminum hydride or an alkylaluminum alkoxide of the formula AlR$^7_b$Y$_{3-b}$ may also be used. In the formula, R$^7$ is a linear or branched alkyl group having from 1 to 10 carbon atoms, and Y is halogen, hydrogen or alkoxy, and b is a number satisfying 0<b<3. Specific examples include dimethylaluminum chloride, methylaluminum sesquichloride, methylaluminum dichloride, diethylaluminum chloride, ethylaluminum sesquichloride, ethylaluminum dichloride, di-n-propylaluminum chloride, di-n-butylaluminum chloride, diisobutylaluminum chloride, isobutylaluminum dichloride, diethylaluminum iodide, diethylaluminum fluoride, diethylaluminum bromide, diisobutylaluminum hydride, diethylaluminum hydride, diethylaluminum methoxide, diethylaluminum ethoxide, diisobutylaluminum methoxide diisobutylaluminum ethoxide and diisobutylaluminum isopropoxide.

These organometallic compounds may be used alone or in combination as a mixture of two or more of them.

As the electron donative compound of component (C), an organic acid ester, an oxygen-containing organic compound of silicon or a nitrogen-containing organic compound is suitable. The organic acid ester may, for example, be a mono- or di-ester of an aromatic carboxylic acid, or a mono- or di-ester of an aliphatic carboxylic acid. Among them, preferred is an aliphatic carboxylic acid ester or an aromatic carboxylic acid ester. Specifically, as the aliphatic carboxylic acid ester, the one having from 2 to 20 carbon atoms, such as ethyl acetate, propyl acetate, butyl acetate, ethyl propionate or ethyl butyrate may, for example, be mentioned. As the aromatic carboxylic acid ester, the one having from 8 to 30 carbon atoms, such as methyl benzoate, ethyl benzoate, methyl toluate, ethyl toluate, methyl anisate or ethyl anisate, may, for example, be mentioned. Such organic esters may be used alone or in combination as a mixture or a reaction product of two or more of them.

As the oxygen-containing organic compound of silicon, a compound of the formula $R^8{}_s Si(OR^9)_t X_{4-(s+t)}$ may be used In this formula, each of $R^8$ and $R^9$ is a linear or branched hydrocarbon group having from 1 to 20 carbon atoms, preferably from 1 to 10 carbon atoms, such as an alkyl group, a cycloalkyl group, an arylalkyl group, an aryl group or an alkylaryl group, or a hydrogen atom, s and t are numbers satisfying $0 \leq s \leq 3$, $1 \leq 4$ and $1 \leq s+t \leq 4$, and X is a halogen atom. Specifically, an alkoxysilane or an aryloxysilane, such as tetramethoxysilane, tetraethoxysilane, tetra-n-propoxysilane, tetra-i-propoxysilane, tetra-n-butoxysilane, tetra-i-pentoxysilane, tetra-n-hexoxysilane, tetraphenoxysilane, tetrakis(2-ethylhexoxy)silane, tetrakis(2-ethylbutoxy)silane, tetrakis(2-methoxyethoxy)silane, trimethoxysilane, methyltrimethoxysilane, ethyltrimethoxysilane, n-propyltrimethoxysilane, i-propyltrimethoxysilane, n-butyltrimethoxysilane, i-butyltrimethoxysilane, sec-butyltrimethoxysilane, t-butyltrimethoxysilane, sec-amyltrimethoxysilane, t-amyltrimethoxysilane, phenyltrimethoxysilane, vinyltrimethoxysilane, chloromethyltrimethoxysilane, 3-chloropropyltrimethoxysilane, 4-chlorophenyltrimethoxysilane, norbornyltrimethoxysilane, norbornenyltrimethoxysilane, cyclohexyltrimethoxysilane, cyclopentyltrimethoxysilane, cyclobutyltrimethoxysilane, cyclopentadienyltrimethoxysilane, triethoxysilane, methyltriethoxysilane, ethyltriethoxysilane, n-propyltriethoxysilane, i-propyltriethoxysilane, n-butyltriethoxysilane, i-butyltriethoxysilane, sec-butyltriethoxysilane, t-butyltriethoxysilane, sec-amyltriethoxysilane, t-amyltriethoxysilane, phenyltriethoxysilane, vinyltriethoxysilane, 3-aminopropyltriethoxysilane, norbonyltriethoxysilane, norbornenyltriethoxysilane, cyclohexyltriethoxysilane, cyclopentyltriethoxysilane, cyclobutyltriethoxysilane, cyclopentadienyltriethoxysilane, cyclohexyltriethoxysilane, cyclopentyltriethoxysilane, cyclobutyltriethoxysilane, dimethoxysilane, methyldimethoxysilane, ethyldimethoxysilane, dimethyldimethoxysilane, diethyldimethoxysilane, diphenyldimethoxysilane, methylphenyldimethoxysilane, ethylphenyldimethoxysilane, dibenzyldimethoxysilane, diethoxysilane, methyldiethoxysilane, ethyldiethoxysilane, dimethyldiethoxysilane, diethyldiethoxysilane, diphenyldiethoxysilane, methylphenyldiethoxysilane, ethylphenyldiethoxysilane, dibenzyldiethoxysilane, n-propylmethyldimethoxysilane, n-propylethyldimethoxysilane, di-n-propyldimethoxysilane, n-propylmethyldiethoxysilane, n-propylethyldiethoxysilane, di-n-propyldiethoxysilane, n-propylethylmethoxyethoxysilane, di-n-propylmethoxyethoxysilane, i-propylmethyldimethoxysilane, i-propylethyldimethoxysilane, di-i-propyldimethoxysilane, n-propyl-i-propyldimethoxysilane, i-propylmethyldiethoxysilane, i-propylethyldiethoxysilane, di-i-propyldiethoxysilane, n-propyl-i-propyldiethoxysilane, i-propylethylmethoxyethoxysilane, di-i-propylmethoxyethoxysilane, n-butylmethyldimethoxysilane, n-butylethyldimethoxysilane, n-butyl-n-propyldimethoxysilane, n-butyl-i-propyldimethoxysilane, di-n-butyldimethoxysilane, n-butylmethyldiethoxysilane, n-butylethyldiethoxysilane, n-butyl-n-propyldiethoxysilane, n-butyl-i-propyldiethoxysilane, di-n-butyldiethoxysilane, n-butylmethylmethoxyethoxysilane, n-butylethylmethoxyethoxysilane, n-butyl-n-propylmethoxyethoxysilane, sec-butylmethyldimethoxysilane, sec-butylethyldimethoxysilane, sec-butyl-n-propyldimethoxysilane, sec-butyl-i-propyldimethoxysilane, sec-butyl-n-butyldimethoxysilane, di-sec-butyldimethoxysilane, sec-butylmethyldiethoxysilane, sec-butylethyldiethoxysilane, sec-butyl-n-propyldiethoxysilane, sec-butyl-i-propyldiethoxysilane, sec-butyl-n-butyldiethoxysilane, di-sec-butyldiethoxysilane, i-butylmethyldimethoxysilane, i-butylethyldimethoxysilane, i-butyl-n-propyldimethoxysilane, i-butyl-i-propyldimethoxysilane, i-butyl-n-butyldimethoxysilane, i-butyl-sec-butyldimethoxysilane, di-i-butyldimethoxysilane, i-butylmethyldiethoxysilane, i-butylethyldiethoxysilane, i-butyl-n-propyldiethoxysilane, i-butyl-ipropyldiethoxysilane, i-butyl-n-butyldiethoxysilane, i-butyl-sec-butyldiethoxysilane, di-i-butyldiethoxysilane, t-butylmethyldimethoxysilane, t-butylethyldimethoxysilane, t-butyl-n-propyldimethoxysilane, t-butyl-i-propyldimethoxysilane, t-butyl-n-butyldimethoxysilane, t-butyl-sec-butyldimethoxysilane, t-butyl-i-butyldimethoxysilane, di-t-butyldimethoxysilane, t-butyl-n-pentyldimethoxysilane, t-butyl-n-hexyldimethoxysilane, t-butylmethyldiethoxysilane, t-butylethyldiethoxysilane, t-butyl-n-propyldiethoxysilane, t-butyl-i-propyldiethoxysilane, t-butyl-n-butyldiethoxysilane, t-butyl-sec-butyldiethoxysilane, t-butyl-i-butyldiethoxysilane, di-t-butyldiethoxysilane, t-butyl-n-pentyldiethoxysilane, t-butyl-n-hexyldiethoxysilane, n-pentylmethyldimethoxysilane, n-pentylethyldimethoxysilane, n-pentyl-n-propyldimethoxysilane, n-pentylmethyldimethoxysilane, n-pentylethyldiethoxysilane, n-pentyl-n-propyldiethoxysilane, (t-amyl)methyldimethoxysilane, t-amyl-i-propyldimethoxysilane, t-butyl-t-amyldimethoxysilane, di(t-amyl)dimethoxysilane, (1,1-diethylpropyl)methyldimethoxysilane, bis(1,1-diethylpropyl)dimethoxysilane, bis(1,1-dicyclohexylethyl)dimethoxysilane, bis(1-cyclohexyl-1-methylethyl)dimethoxysilane, bis(1-cyclohexylethyl)dimethoxysilane, (sec-amyl)methyldimethoxysilane, di-(sec-amyl)dimethoxysilane, diisoamyldimethoxysilane, (t-amyl)methyldiethoxysilane, t-amyl-i-propyldiethoxysilane, t-butyl-t-amyldiethoxysilane, di(t-amyl)diethoxysilane, (1,1-diethylpropyl)methyldiethoxysilane, bis(1,1-diethylpropyl)diethoxysilane, bis(1,1-dicyclohexylethyl)diethoxysilane, bis(1-cyclohexyl-1-methylethyl)diethoxysilane, bis(1-cyclohexylethyl)diethoxysilane, di(sec-amyl)diethoxysilane, (sec-amyl)methyldiethoxysilane, diisoamyldiethoxysilane, n-hexylmethyldimethoxysilane, n-hexylethyldimethoxysilane, n-hexyl-n-propyldimethoxysilane, di-n-hexyldimethoxysilane, n-hexylmethyldiethoxysilane, n-hexylethyldiethoxysilane, n-hexyl-n-propyldiethoxysilane, n-heptylmethyldimethoxysilane, n-heptylethyldimethoxysilane, n-heptyl-n-propyldimethoxysilane, n-heptylmethyldiethoxysilane, n-heptylethyldiethoxysilane, n-heptyl-n-propyldiethoxysilane, n-octylmethyldimethoxysilane, n-octylethyldimethoxysilane, n-octyl-n-propyldimethoxysilane, n-octylmethyldiethoxysilane, n-octylethyldiethoxysilane, n-octyl-n-propyldiethoxysilane, n-nonylmethyldimethoxysilane, n-nonylethyldimethoxysilane, n-nonylmethyldiethoxysilane, n-nonylethyldiethoxysilane, n-decylmethyldimethoxysilane, n-decylethyldimethoxysilane, n-decylmethyldiethoxysilane, n-decylethyldiethoxysilane, dinorbornyldimethoxysilane, norbornylmethyldimethoxysilane, dinorbornenyldimethoxysilane, norbornenylmethyldimethoxysilane, dicyclohexyldimethoxysilane, cyclohexylmethyldimethoxysilane, dicyclopentyldimethoxysilane, cyclopentylmethyldimethoxysilane, dicyclobutyldimethoxysilane, cyclobutylmethyldimethoxysilane, dicyclopentadienyldimethoxysilane, cyclopentadienylmethyldimethoxysilane, dinorbornyldiethoxysilane, norbornylmethyldiethoxysilane, dinorbornenyldiethoxysilane, norbornenylmethyldiethoxysilane, dicyclohexyldiethoxysilane, cyclohexylmethyldiethoxysilane, dicyclopentyldiethoxysilane, cyclopentylmethyldiethoxysilane, dicyclobutyldiethoxysilane, cyclobutylmethyldiethoxysilane, dicyclopentadienyldiethoxysilane, cyclopentadienylmethyldiethoxysilane, dicyclohexenyldimethoxysilane, cyclohexenylmethyldimethoxysilane, cyclohexylethyldimethoxysilane, cyclohexyl-n-propyldimethoxysilane, cyclohexylisopropyldimethoxysilane, cyclohexylbutyldimethoxysilane, cyclopentylethyldimethoxysilane, cyclopentylbutyldimethoxysilane, cyclopentyl-i-butyldimethoxysilane, cyclohexylvinyldimethoxysilane, cyclopentylvinyldimethoxysilane, cyclobutylvinyldimethoxysilane, i-propylvinyldimethoxysilane, i-butylvinyldimethoxysilane, sec-butylvinyldimethoxysilane, t-butylvinyldimethoxysilane, cyclohexylvinyldiethoxysilane, cyclopentylvinyldiethoxysilane, cyclobutylvinyldiethoxysilane, i-propylvinyldiethoxysilane, i-butylvinyldiethoxysilane, sec-butylvinyldiethoxysilane, t-butylvinyldiethoxysilane, trimethylethoxysilane, dimethylmethoxysilane, trimethylmethoxysilane, trimethyl-i-propoxysilane, trimethyl-n-propoxysilane, trimethyl-t-butoxysilane, trimethyl-i-butoxysilane, trimethyl-n-butoxysilane, trimethyl-n-pentoxysilane or trimethylphenoxysilane, or a haloalkoxysilane or a haloaryloxysilane, such as dichlorodiethoxysilane, dichlorodiphenoxysilane or tribromoethoxysilane, may, for example, be mentioned. Such oxygen-containing organic compounds of silicon may be used alone or in combination as a mixture or a reaction product of two or more of them.

As the nitrogen-containing organic compound, a compound having a nitrogen atom in its molecule and having a function as a Lewis base, may be mentioned. Specifically, it may be an amide compound such as acetic acid N,N-dimethylamide, benzoic acid N,N-dimethylamide or toluic acid N,N-dimethylamide, a piperidine compound such as 2,2,6,6-tetramethylpiperidine, 2,6-diisopropylpiperidine, 2,6-diisobutylpiperidine, 2,6-diisobutyl-4-methylpiperidine, 2,2,6-trimethylpiperidine, 2,2,6,6-tetraethylpiperidine, 1,2,2,6,6-pentamethylpiperidine, 2,2,6,6-tetramethyl-4-piperidyl benzoate or bis(2,2,6,6-tetramethyl-4-piperidyl)sebacate, a pyridine compound such as 2,6-diisopropylpyridine, 2,6-diisobutylpyridine or 2-isopropyl-6-methylpyridine, a pyrrolidine compound such as 2,2,5,5-tetramethylpyrrolidine, 2,5-diisopropylpyrrolidine, 2,2,5-trimethylpyrrolidine, 1,2,2,5,5-pentamethylpyrrolidine or 2,5-diisobutylpyrrolidine, an amine compound such as trimethylamine, triethylamine, tributylamine, tribenzylamine, tetramethylethylenediamine, diisopropylethylamine, tert-butyldimethylamine, diphenylamine or di-o-tolylamine, or an aniline compound such as N,N-diethylaniline or N,N-diisopropylaniline. Such nitrogen-containing organic compounds may be used alone or in combination as a mixture or a reaction product of two or more of them.

These electron donative compounds may be used in combination.

As the boron compound of component (D), the one represented by the formula $R^1_n BX_{3-n}$ may be used In the formula, $R^1$ is a hydrocarbon group or a halogenated hydrocarbon group having from 1 to 10 carbon atoms, such as an alkyl group, an arylalkyl group, an aryl group or an alkylaryl group, or a halogenated substituent thereof, n is a number satisfying $0 \leq n \leq 3$, and X is a halogen atom. Specific examples of such a boron compound include trichloroborane, tribromoborane, trimethylborane, triethylborane, tri-n-propylborane, triisopropylborane, tri-n-butylborane, tri-sec-butylborane, tri-i-tributylborane, tri-t-butylborane, tri-n-pentylborane, n-hexylborane, tri-n-octylborane, tribenzylborane, triphenylborane, tris(pentafluorophenyl)borane, tris(pentachlorophenyl)borane, tris(pentabromophenyl)borane, tris(4-chlorohexafluorophenyl)borane, tris(4-bromohexafluorophenyl)borane, tris(3,5-dichloro-2,4-6-trifluorophenyl)borane, tris(3,5-dibromo-2,4,6-trichlorophenyl)borane, tris(2,3-difluorophenyl)borane, tris(3-fluorophenyl)borane, tris(2-trifluoromethylphenyl)borane, tris(3-trifluoromethylphenyl)borane, chlorodimethylborane, bromodimethylborane, dimethylethylborane, dimethylphenylborane, chlorodiethylborane, bromodiethylborane, diethylmethylborane, diethylphenylborane, chlorodiphenylborane, bromodiphenylborane, diphenylmethylborane, diphenylethylborane, chlorobis(pentfluorophenyl)borane, chlorobis(pentachlorophenyl)borane, chlorobis(pentabromophenyl)borane, chlorobis(4-chlorohexafluorophenyl)borane, chlorobis(4-bromohexafluorophenyl)borane, chlorobis(3,5-dibromo-2,4,6-trichlorophenyl)borane, chlorobis(2-trifluoromethylphenyl)borane, chlorobis(3-trifluoromethylphenyl)borane, bromobis(pentafluorophenyl)borane, bromobis(pentachlorophenyl)borane, bromobis(pentabromophenyl)borane, bromobis(4-chlorohexafluorophenyl)borane, bromobis(4-bromohexafluorophenyl)borane, bromobis(3,5-dibromo-2,4,6-trichlorophenyl)borane, bromobis(2-trifluoromethylphenyl)borane, bromobis(3-trifluoromethylphenyl)borane, dichloromethylborane, dichloroethylborane, dichloro-n-propylborane, dichlorophenylborane, dichloro(pentafluorophenyl)borane, dibromomethylborane, dibromoethylborane, dibromo-n-propylborane, dibromophenylborane and dibromo(pentafluorophenyl)borane.

The catalyst component (A) is used preferably in an amount corresponding to from 0.001 to 2.5 mg atom of the titanium atom in the catalyst component (A) per liter of the reactor. The organometallic compound of component (B) is used in an amount corresponding to from 1 to 2,000 mol, preferably from 2 to 500 mol, per gram atom of titanium in the catalyst component (A). The electron donative compound of component (C) is used in an amount corresponding to from 0.001 to 20 mol, preferably from 0.01 to 5 mol, per mol of the organometallic compound of component (B). The boron compound of component (D) is used in an amount corresponding to from 0.0001 to 20 mol, preferably from 0.001 to 5 mol, per mol of the electron donative compound of component (C).

The manner of introducing the four components in the present invention is not particularly limited. It is possible to employ, for example, a method wherein the components (A), (B), (C) and (D) are separately introduced into a polymerization reactor, a method wherein the components (A) and (B) are contacted, and then the component (C) and the component (D) are contacted for polymerization, a method wherein the components (C) and (D) are contacted, and then the components (A) and (B) are contacted for polymerization, or a method wherein the components (A), (B) and (C) are contacted, and then the component (D) is contacted for polymerization, or a method wherein the components (A) and (B), and the components (C) and (D) are preliminarily contacted for polymerization.

Polymerization of an olefin is conducted in a gas phase or in a liquid phase at a reaction temperature lower than the melting point of the polymer. When the polymerization is conducted in a liquid phase, the olefin itself may be used as the reaction medium, but an inert solvent may be used as the reaction medium. As such an inert solvent, any solvent which is commonly used in this technical field, may be used. However, an alkane or a cycloalkane having from 4 to 20 carbon atoms, such as isobutane, pentane, hexane or cyclohexane, may preferably be used.

As the olefin to be polymerized by the method for producing a stereoregular polyolefin according to the present invention, ethylene and/or an α-olefin of the formula R—CH=$CH_2$ wherein R is a linear or branched, substituted or unsubstituted alkyl group having from 1 to 10 carbon atoms, preferably from 1 to 8 carbon atoms, may be used. Specifically, such an α-olefin may, for example, be propylene, 1-butene, 1-pentene, 4-methyl-1-pentene or 1-octene.

These olefins may be subjected to not only homopolymerization, but also random copolymerization or block copolymerization. In the case of copolymerization, at least two members from the above-mentioned ethylene and/or α-olefins, or an α-olefin and a diene such as butadiene or isoprene, are used for polymerization. It is particularly preferred to conduct polymerization by using propylene, propylene and ethylene, propylene and the above-mentioned α-olefin other than propylene, or propylene and a diene.

The reaction conditions for polymerization are not particularly limited so long as the reaction is conducted at a reaction temperature lower than the melting point of the polymer. However, they are usually selected so that the reaction temperature will be from 20° to 100° C., and the pressure will be from 2 to 50 kg/$cm^2$G.

The reactor to be used for the polymerization step may be of any type which is commonly used in this technical field. Namely, using a stirring tank type reactor, a fluidized bed reactor or a circulating system reactor, the polymerization operation can be conducted by any one of the continuous, semi-batch and batch systems. Further, the polymerization can be conducted in a plurality of steps under different polymerization conditions.

Now, the present invention will be described in further detail with reference to Examples. However, it should be understood that the present invention is by no means restricted by such specific Examples. In the Examples and Comparative Examples, the melt flow rate (hereinafter referred to simply as MFR) was measured in accordance with JIS K7210 condition 14.

The xylene soluble content (hereinafter referred to simply as $X_y$) as an index of stereoregularity, is measured as follows. 4 g of a polymer is dissolved in 200 ml of xylene and then left to stand at 25° C. for one hour in a constant temperature tank, whereupon the precipitates are filtered off to recover the filtrate. Xylene is evaporated from the filtrate, and the residue is further subjected to vacuum drying to recover the xylene soluble content, which is then represented by the percentage to the weight of the initial sample.

The activity shows the amount (g) of a polymer produced per gram of the solid component, which does not contain the pre-polymerized portion.

With respect to the width of the particle size distribution of the polymer particles, the results obtained by classifying the polymer particles by sieves, are plotted on a probability logarithmic paper to obtain the geometric standard deviation from the approximated straight line in a known manner, and the width is expressed in terms of its common logarithm (hereinafter referred to as σ).

Further, the average particle size is a value obtained by reading the particle size corresponding to the weight accumulated value 50% of the above approximated line.

The content of fine particles was represented by the weight percentage of the proportion of fine particles having a particle size of not more than 105 μm.

EXAMPLE 1

(a) Preparation of solid catalyst component (A)

Into a 3 l flask equipped with a stirrer, 15 g (0.62 mol) of metal magnesium powder were charged, and 0.75 g of iodine, 229.4 (3.1 mol) of butanol, 210 g (0.62 mol) of titanium tetra-n-butoxide and 252 g (1.23 mol) of tri-i-propoxyaluminum were added thereto. The mixture was heated to 90° C. and stirred for one hour under sealing with nitrogen. Then, the temperature was raised to 120° C., and the reaction was conducted for 2 hours to obtain a homogeneous solution containing magnesium, titanium and aluminum (a Mg—Ti—Al solution).

Into a flask equipped with a baffle and having an internal capacity of 500 ml, the Mg—Ti—Al solution was charged in an amount of 0.066 mol in terms of Mg and cooled to 0° C. Then, a solution having 20.5 g (0.13 mol) of isobutylaluminum dichloride diluted with a solvent mixture of 120 ml of hexane and 50 ml of 1,2-dichloroethane, was added thereto over a period of 2 hours. After adding the entire amount, the temperature was raised to 70° C. over a period of 2 hours to obtain a slurry containing a white solid product. The solid product was separated by filtration and then washed with hexane.

The slurry containing the white solid product thus obtained was charged into a 1 l electromagnetic stirring type autoclave made of glass, and a solution having 125 g (0.66 mol) of titanium tetrachloride diluted with 125 g of chlorobenzene, was added thereto in its entire amount. Then, 7.3 g (0.026 mol) of diisobutyl phthalate was added thereto, and the mixture was reacted at 100° C. for 2 hours. The product was filtered to obtain a solid content, which was again suspended in a solution having 125 g of titanium tetrachloride diluted with 125 g of chlorobenzene, and the suspension was stirred at 100° C. for 2 hours. To the product, hexane was added, and an washing operation was thoroughly conducted until a free titanium compound was no more detected. Thus, a slurry of a solid component suspended in hexane was obtained. After removing the supernatant, the slurry was dried under a nitrogen atmosphere and subjected to elemental analysis, whereby Ti was 2.8% by weight.

The interior of an electromagnetic stirring type autoclave made of stainless steel and having an internal capacity of 1 l, was thoroughly flushed with nitrogen, 5.0 g of the obtained solid component, 300 ml of hexane and 12.5 mmol of triethylaluminum were sequentially charged. After adjusting the internal pressure of the autoclave to 0.1 kg/cm$^2$G and the internal temperature to 20° C., stirring was initiated. While maintaining the internal temperature at 20° C., 15 g of propylene was supplied over a period of 20 minutes, followed by stirring for 30 minutes. A propylene prepolymer of the solid catalyst component thus obtained, was separated by filtration and thoroughly washed with hexane. After removing the supernatant, it was dried under a nitrogen atmosphere, whereupon the yield was 18.5 g.

(b) Polymerization of propylene

The interior of an electromagnetic stirring type autoclave made of stainless steel and having an internal capacity of 5 l, was thoroughly flushed with nitrogen, and 1.2 mmol of triethylaluminum as catalyst component (B), 0.23 mmol of n-propyl trimethoxysilane as catalyst component (C), 0.07 mmol of trichloroborane as catalyst component (D) and 37 mg (corresponding to 10 mg of the solid component) of the propylene prepolymer of solid catalyst component (A) were sequentially charged. After adjusting the internal pressure of the autoclave to 0.1 kg/cm$^2$G, 0.2 kg/cm$^2$G of hydrogen was charged, and 2000 ml of liquid propylene was added thereto, and stirring was initiated. Then, temperature was raised to 70° C., and polymerization was conducted for 90 minutes. After completion of the polymerization reaction, stirring was stopped and at the same time, unreacted propylene in the system was discharged, and the formed polymer was recovered. As a result, the formed polymer was 363 g, and the activity per gram of the solid component was 36300 g/g. Various properties of the polymer particles were examined to obtain results such that MFR was 1.28 g/10 min, $X_Y$ was 1.5%, the bulk density was 0.46 g/cm$^3$, the average particle size was 1460 μm, σ was 0.12, and the fine particle content was 0% by weight. Further, the formed polymer particles were spherical.

EXAMPLE 2

Using the same propylene prepolymer of solid catalyst component (A) as prepared in Example 1, polymerization of propylene was conducted under the same conditions as in step (b) of Example 1 except that 0.23 mmol of triethylborane was used instead of trichloroborane used as catalyst component (D) in Example 1. As a result, the formed polymer was 251 g, and the activity per gram of the solid component was 25100 g/g. Various properties of the polymer particles were examined to obtain results such that MFR was 1.61 g/10 min, $X_Y$ was 1.1%, the bulk density was 0.46 g/cm$^3$, the average particle size was 1290 μm, σ was 0.12, and the fine particle content was 0% by weight. Further, the formed polymer particles were spherical.

EXAMPLE 3

Using the same propylene prepolymer of solid catalyst component (A) as prepared in Example 1, polymerization of propylene was conducted under the same conditions as in step (b) of Example 1 except that 0.01 mmol of tris(pentafluorophenyl)borane was used instead of trichloroborane used as catalyst component (D) in Example 1. As a result, the formed polymer was 367 g, and the activity per gram of the solid component was 36700 g/g. Various properties of the polymer particles were examined to obtain results such that MFR was 1.61 g/10 min, $X_Y$ was 1.3%, the bulk density was 0.46 g/cm$^3$, the average particle size was 1470 μm, σ was 0.12, and the fine particle content was 0% by weight. Further, the formed polymer particles were spherical.

EXAMPLE 4

Using the same propylene prepolymer of solid catalyst component (A) as prepared in Example 1, polymerization of propylene was conducted under the same conditions as in step (b) of Example 1 except that 0.29 mmol of t-butyl-n-propyldimethoxysilane was used instead of n-propyltrimethoxysilane used as catalyst component (C) in Example 1, 0.006 mmol of trichloroborane was used as catalyst component (D), and hydrogen was added in an amount of 0.5 kg/cm$^2$G. As a result, the formed polymer was 514 g, and the activity per gram of the solid component was 51400 g/g. Various properties of the polymer particles were examined to obtain results such that MFR was 0.85 g/10 min, $X_Y$ was 0.8%, the bulk density was 0.48 g/cm$^3$, the average particle size was 1620 μm, σ was 0.11, and the fine particle content was 0% by weight. Further, the formed polymer particles, were spherical.

EXAMPLE 5

Using the same propylene prepolymer of solid catalyst component (A) as prepared in Example 1, polymerization of propylene was conducted under the same conditions as in Example 4 except that 0.10 mmol of triethylborane was used instead of trichloroborane used as catalyst component (D) in Example 4. As a result, the formed polymer was 485 g, and the activity per gram of the solid component was 48500 g/g. Various properties of the polymer particles were examined to obtain results such that MFR was 0.80 g/10 min, $X_Y$ was 0.8%, the bulk density was 0.48 g/cm$^3$, the average particle size was 1610 μm, σ was 0.11, and the fine particle content was 0% by weight. Further, the formed polymer particles were spherical.

EXAMPLE 6

Using the same propylene prepolymer of solid catalyst component (A) as prepared in Example 1, polymerization of propylene was conducted under the same conditions as in Example 4 except that 0.01 mmol of tris(pentafluorophenyl)borane was used instead of trichloroborane used as catalyst component (D) in Example 4. As a result, the formed polymer was 553 g, and the activity per gram of the solid component was 55300 g/g. Various properties of the polymer particles were examined to obtain results such that MFR was 1.08 g/10 min, $X_Y$ was 0.9%, the bulk density was 0.46 g/cm$^3$, the average particle size was 1680 μm, σ was 0.11, and the fine particle content was 0% by weight. Further, the formed polymer particles were spherical.

EXAMPLE 7

Using the same propylene prepolymer of solid catalyst component (A) as prepared in Example 1, polymerization of propylene was conducted under the same conditions as in step (b) of Example 1 except that 0.29 mmol of diphenyldimethoxysilane was used instead of n-propyltrimethoxysilane used as catalyst component (C) in Example 1 and 0.03 mmol of triethylborane was used as catalyst component (D). As a result, the formed polymer was 507 g, and the activity per gram of the solid component was 50700 g/g. Various properties of the polymer particles were examined to obtain results such that MFR was 1.01 g/10 min, $X_Y$ was 0.9%, the bulk density was 0.49 g/cm$^3$, the average particle size was 1630 vm, σ was 0.11, and the fine particle content was 0% by weight. Further, the formed polymer particles were spherical.

Comparative Example 1

Using 37 mg (corresponding to 10 mg of the solid component) of the same propylene prepolymer of solid catalyst component (A) as prepared in step (a) of Example 1, polymerization of propylene was conducted in the same manner as in step (b) of Example 1 except that the catalyst component (D) was not added.

As a result, the activity was 16200 g/g. Various properties of the polymer particles were measured to obtain results such that MFR was 1.48 g/10 min, $X_Y$ was 1.5%, the bulk density was 0.46 g/cm$^3$ the average particle size was 1220 μm, σ was 0.12, and the fine particle content was 0% by weight. Further, the formed polymer particles were spherical.

Comparative Example 2

Using 37 mg (corresponding to 10 mg of the solid component) of the same propylene prepolymer of solid catalyst component (A) as prepared in step (a) of Example 1, polymerization of propylene was conducted in the same manner as in Example 4 except that the catalyst component (D) was not added.

As a result, the activity was 37200 g/g. Various properties of the polymer particles were measured to obtain results such that MFR was 0.97 g/10 min, $X_Y$ was 1.1%, the bulk density was 0.48 g/cm$^3$ the average particle size was 1550 μm, σ was 0.11, and the fine particle content was 0% by weight. Further, the formed polymer particles were spherical.

Comparative Example 3

Using 37 mg (corresponding to 10 mg of the solid component) of the same propylene prepolymer of solid catalyst component (A) as prepared in step (a) of Example 1, polymerization of propylene was conducted in the same manner as in Example 7 except that the catalyst component (D) was not added.

As a result, the activity was 33300 g/g. Various properties of the polymer particles were measured to obtain results such that MFR was 0.97 g/10 min, $X_Y$ was 1.4%, the bulk density was 0.48 g/cm$^3$, the average particle size was 1600 μm, σ was 0.11, and the fine particle content was 0% by weight. Further, the formed polymer particles were spherical.

Comparative Example 4

Using 37 mg (corresponding to 10 mg of the solid component) of the same propylene prepolymer of solid catalyst component (A) as prepared in step (a) of Example 1, polymerization of propylene was conducted in the same manner as in Example 4 except that 0.14 mmol of triethylborane was used instead of trichloroborane used as catalyst component (D).

As a result, the activity was 10600 g/g. Various properties of the polymer particles were measured to obtain results such that MFR was 0.98 g/10 min, $X_Y$ was 1.4%, the bulk density was 0.48 g/cm$^3$, the average particle size was 1120 μm, σ was 0.13, and the fine particle content was 0% by weight. Further, the formed polymer particles were spherical.

Further, the polymerization results of Examples 1 to and Comparative Examples 1 to 4 are shown in Table 1.

TABLE 1

|  | Activity g/g cata. | MFR g/10 min. | $X_Y$ % | Bulk density g/cm$^3$ | Average particle size μm | σ | Fine particle content % |
| --- | --- | --- | --- | --- | --- | --- | --- |
| Example 1 | 36300 | 1.3 | 1.5 | 0.46 | 1460 | 0.12 | 0 |
| Example 2 | 25100 | 1.6 | 1.1 | 0.46 | 1290 | 0.12 | 0 |
| Example 3 | 36700 | 1.6 | 1.3 | 0.46 | 1470 | 0.12 | 0 |
| Example 4 | 51400 | 0.8 | 0.8 | 0.48 | 1620 | 0.11 | 0 |
| Example 5 | 48500 | 0.8 | 0.8 | 0.48 | 1610 | 0.11 | 0 |
| Example 6 | 55300 | 1.1 | 0.8 | 0.46 | 1680 | 0.11 | 0 |
| Example 7 | 50700 | 1.0 | 0.9 | 0.49 | 1630 | 0.11 | 0 |
| Comparative Example 1 | 16200 | 1.5 | 1.5 | 0.46 | 1220 | 0.12 | 0 |
| Comparative Example 2 | 37200 | 1.0 | 1.1 | 0.48 | 1600 | 0.11 | 0 |
| Comparative Example 3 | 33300 | 1.6 | 1.4 | 0.48 | 1550 | 0.11 | 0 |
| Comparative Example 4 | 10600 | 1.0 | 1.2 | 0.48 | 1120 | 0.13 | 0 |

The first effect of the present invention is that the particle properties are excellent in that polymer particles having a high bulk density and having a desired average particle size can be obtained with little content of fine particles. The present invention is particularly effective when applied to a gas phase polymerization.

The second effect of the present invention is that a polymer can be obtained under a higher activity while maintaining the stereoregularity, as compared with the conventional method. Accordingly, it is possible to obtain a polymer which does not require a deashing step for the purpose of removing the residual catalyst, the product is free from coloring or odor, whereby the process will be very economical without necessity to purify the polymer.

The third effect of the present invention is that the stereoregularity of the polymer is very good. Accordingly, the present invention is very advantageous for the production of a polymer by a gas phase polymerization method using no reaction medium. Further, a polymer having high rigidity can be produced in good yield.

We claim:

1. A method for producing a stereoregular polypropylene in the presence of a catalyst comprising a transition metal compound and an organometallic compound, which comprises polymerizing propylene at a temperature from 20° to 100° C. and a pressure from 2 to 50 kg/cm²G olefin in the presence of a catalyst system comprising:

(A) a solid catalyst component comprising Mg, Ti, halogen and an electron donative compound, prepared by reacting
  (i-1) metal magnesium and a $C_{1-18}$ alcohol,
  (i-2) an oxygen-containing organic compound of aluminum having formula $Al(OR^2)_m X_{3-m}$ wherein $R^2$ is a $C_{1-20}$-hydrocarbon group, X is a halogen, and $0 < m \leq 3$, and
  (i-3) an oxygen-containing organic compound of titanium having the formula $(O_p Ti_u (OR^3)_q)_s$ wherein $R^3$ is a $C_{1-20}$-hydrocarbon group, p, q and u are such that $p \geq 0$, $q > 0$ and $u \geq 1$ and they are numbers agreeable with the valence of Ti, and s is an integer, to obtain a homogeneous solution; reacting the homogeneous solution with
  (i-4) an aluminum halide having the formula $AlR^4_r X_{3-r}$ wherein $R^4$ is a $C_{1-20}$-hydrocarbon group, X is a halogen atom, and $0 < r \leq 2$, to obtain a solid product; and reacting the solid product with
  (i-5) an electron donative compound selected from the group consisting of ethers, esters, ketones, phenols, amines, amides, imines, nitriles, phosphines, phosphites, stilbines, arsines, phosphoryl amides and alcoholates, and
  (i-6) a titanium halide compound having the formula $Ti(OR^5)_f X_{4-f}$ wherein $R^5$ is a $C_{1-20}$-hydrocarbon group, X is a halogen atom, and $0 \leq f < 4$, (B) at least one organoaluminum compound (C) an electron donative compound selected from the group consisting of organic acid esters, oxygen-containing organic compounds of silicon and nitrogen-containing organic compounds, and (D) tris(pentafluorophenyl)borane;

wherein the molar ratio of magnesium atoms in component (i-1) to oxygen-containing organic compound of aluminum in component (i-2) is from 1:0.01 to 1:20; the molar ratio of magnesium atoms in component (i-1) to oxygen-containing organic compound of titanium in component (i-3) is from 1:0.01 to 1:20; the ratio of magnesium atoms in component (i-1) to aluminum atoms in said aluminum halide of component (i-4) is from 1:0.1 to 1:100; the molar ratio of magnesium atoms in component (i-1) to electron donative compound in component (i-5) is from 1:0.05 to 1:5.0; the molar ratio of magnesium atoms in component (i-1) to halogenated titanium compound in component (i-6) is from 1:1 to 1:100; and wherein catalyst component (A) is used in an amount of 0.001 to 2.5 mg atom of titanium atoms in said catalyst component (A) per liter of reactor, catalyst component (B) is used in an amount of 1 to 2,000 mol per gram atom of titanium in catalyst component (A), catalyst component (C) is used in an amount of 0.001 to 20 mol per mol of said trialkyl aluminum or alkyl aluminum halide compound of component (B), and catalyst component (D) is used in an amount of 0.0001 to 20 mol per mol of said electron donative compound in component (C), wherein components (i-1), (i-2) and (i-3) are heated to a temperature from −50° to 300° C. for 0.5–50 hours in an inert gas atmosphere to form said homogeneous solution; components (i-4), (i-5) and (i-6) are reacted with said homogeneous solution at a temperature of from −50° to 200° C. for 0.2–50 hours under an inert gas atmosphere to form solid catalyst component (A), and then catalyst components (A), (B), (C) and (D) are contacted with one another.

2. The method of claim 1, wherein the molar ratio of magnesium atoms in component (i-1) to oxygen-containing organic compound of aluminum in component (i-2) is from 1:0.05 to 1:10; the molar ratio of magnesium atoms in component (i-1) to oxygen-containing organic compound of titanium in component (i-3) is from 1:0.1 to 1:5; the molar ratio of magnesium atoms in component (i-1) to aluminum atoms in said aluminum halide of component (i-4) is from 1:0.1 to 1:20; the molar ratio of magnesium atoms in component (i-1) to electron donative compound in component (i-5) is from 1:0.1 to 1:2.0; the molar ratio of magnesium atoms in component (i-1) to halogenated titanium compound in component (i-6) is from 1:3 to 1:50.

3. The method of claim 2, wherein components (i-1), (i-2) and (i-3) are heated to a temperature from 0°–200° C. for 1–6 hours.

4. The method of claim 3, wherein components (i-4), (i-5) and (i-6) are heated with said homogeneous solution at a temperature of from −30° to 150° C. for 0.5–10 hours.

5. The method of claim 1, wherein the organoaluminum compound is of the formula $AlR^7_b Y_{3-b}$, wherein $R^7$ is a $C_{1-10}$ alkyl group, Y is halogen, hydrogen or alkoxy and b=1, 1.5 or 2.

* * * * *